No. 818,635. PATENTED APR. 24, 1906.
W. McCANSE.
NUT LOCK.
APPLICATION FILED MAY 20, 1905.
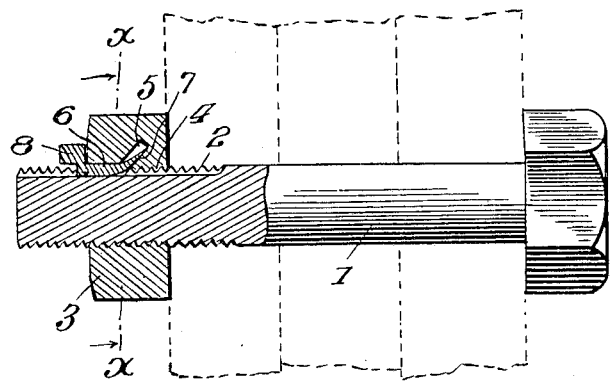
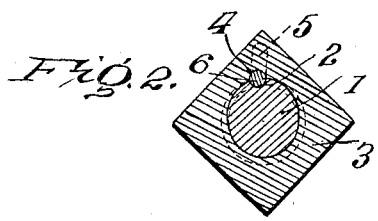
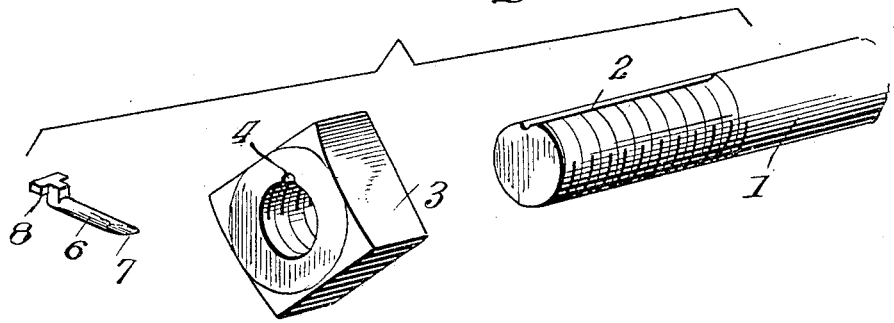
Inventor
W. McCanse.
Witnesses

UNITED STATES PATENT OFFICE.

WILLIAM McCANSE, OF FREDERICK, OKLAHOMA TERRITORY.

NUT-LOCK.

No. 818,635.　　　Specification of Letters Patent.　　　Patented April 24, 1906.

Application filed May 20, 1905. Serial No. 261,386.

*To all whom it may concern:*

Be it known that I, WILLIAM McCANSE, a citizen of the United States, residing at Frederick, in the county of Comanche, Territory of Oklahoma, have invented certain new and useful Improvements in Nut-Locks, of which the following is a specification.

This invention relates to improvements in nut-locks, and has for its object to produce a device of this character which will be simple and durable in construction and which will be positive in operation.

Reference is to be had to the accompanying drawings, in which—

Figure 1 is a longitudinal vertical sectional view. Fig. 2 is a sectional view on the line X X of Fig. 1. Fig. 3 is a detail perspective view of the various parts.

Corresponding and like parts are referred to in the following description and indicated in all the views of the drawings by the same reference characters.

The numeral 1 designates the bolt, the threaded portion of which is provided with a longitudinal groove 2, cut to about the depth of the threads. The nut 3 has a corresponding groove 4 extending partly through its threaded portion and terminating in a recess 5, drilled into the nut at an angle to its axis. A locking-pin 6 is used in connection with the above-described bolt and nut and is provided with a beveled point 7 and a head 8. The groove 4 in the nut is preferably cut deeper than the threads, so that the point of the locking-pin will positively engage with a side of the recess 5.

In operation the nut is screwed up to the desired point and is then turned so that the groove 4 in the nut is opposite the groove 3 in the bolt and the locking-pin 6 forced into the opening thus formed. When the beveled point 7 of the locking-pin engages the side of the recess 5, it is deflected and bent so that the pin can only be removed by the application of force and will not be in danger of accidental displacement. Since the head 8 of the locking-pin is made wider than the pin itself, the face thereof which comes adjacent the bolt prevents the pin from turning, so that the beveled point 7 is always held away from the bolt and a positive engagement with a side of the recess 5 assured. In order to unlock the nut, it is simply necessary to insert some tool under the head 8 of the locking-pin 6 and pull same out of position. It will be obvious that where a finer adjustment is required a plurality of grooves may be made in the bolt. Attention is called to the fact that the head of the pin is approximately T-shaped, thereby enabling it to be easily withdrawn by a claw or other tool.

From the foregoing description it will be readily understood that I have invented a nut-lock which can be used repeatedly without deteriorating from its value and which is so simple in construction as to render its general adoption a practical question.

Having thus described the invention, what I claim as new, and desire to secure by Letters Patent, is—

1. In a nut-lock, the combination of a bolt having a longitudinal groove therein, a nut having a corresponding groove extending therein from one end and terminating within the nut in an inclined wall, and a locking-pin having a beveled point and a head, one face of the head coming adjacent to the side of the bolt and being of such a width as to prevent the locking-pin from turning and thereby always holding the beveled point away from the bolt and insuring its correct engagement with the before-mentioned inclined wall, said locking-pin fitting into the corresponding grooves and being adapted to be locked in position by having its point deflected by impinging upon the inclined wall.

2. In a nut-lock, the combination of a bolt having a longitudinal groove therein, a nut having a corresponding groove extending therein from one end and terminating within the nut in an inclined wall, and a locking-pin having a beveled point and a head, the portion of the shank adjacent the head being formed with an offset so as to permit the head to come adjacent to the side of the bolt, the face of the head adjacent the bolt being of such a width as to prevent the locking-pin from turning and thereby always holding the beveled point away from the bolt and insuring its correct engagement with the before-mentioned inclined wall, said locking-pin fitting into the corresponding grooves and being adapted to be locked in position by having its point deflected by impinging upon the inclined wall.

In testimony whereof I affix my signature in presence of two witnesses.

WILLIAM McCANSE. [L. S.]

Witnesses:
　S. E. PATTON,
　A. LAIR.